United States Patent [19]

English et al.

[11] Patent Number: 4,545,001

[45] Date of Patent: Oct. 1, 1985

[54] SEALED LENS MEMBER FOR USE IN A MOTOR VEHICLE LIGHTING SYSTEM

[75] Inventors: George J. English, Reading; Robert E. Levin, South Hamilton, both of Mass.

[73] Assignee: GTE Products Corporation, Stamford, Conn.

[21] Appl. No.: 598,604

[22] Filed: Apr. 10, 1984

[51] Int. Cl.⁴ .................................................. F21V 5/02
[52] U.S. Cl. ...................................... 362/340; 362/61; 362/240; 362/244; 362/330; 362/332
[58] Field of Search ...................... 362/61, 80, 83, 240, 362/244, 339, 340, 330, 332

[56] References Cited

U.S. PATENT DOCUMENTS 4,329,738  5/1982  Heinz ...................................... 362/61
4,459,644  7/1984  Bailly ...................................... 362/80

Primary Examiner—Donald P. Walsh
Attorney, Agent, or Firm—Lawrence R. Fraley

[57] ABSTRACT

A lens member for use in a motor vehicle and adapted for being mounted in a recess within a front, contoured surface of the motor vehicle. The system especially designed for using the invention includes a plurality of separate lighting modules, each in turn including a light source and reflector means. The lens member comprises a hollow, enclosed, single piece lens element having a front, clear surface positioned to coincide with the vehicle's front, contoured surface so as to enhance aerodynamic performance of the lighting system (as well as the vehicle), a rear lensing portion positioned substantially at a predetermined angle (i.e., 0 to 30 degrees) relative to the front, planar surface of the modules located adjacent thereto, and side and bottom walls for enclosing the lens member to provide a sealed, dirt-free component.

9 Claims, 4 Drawing Figures

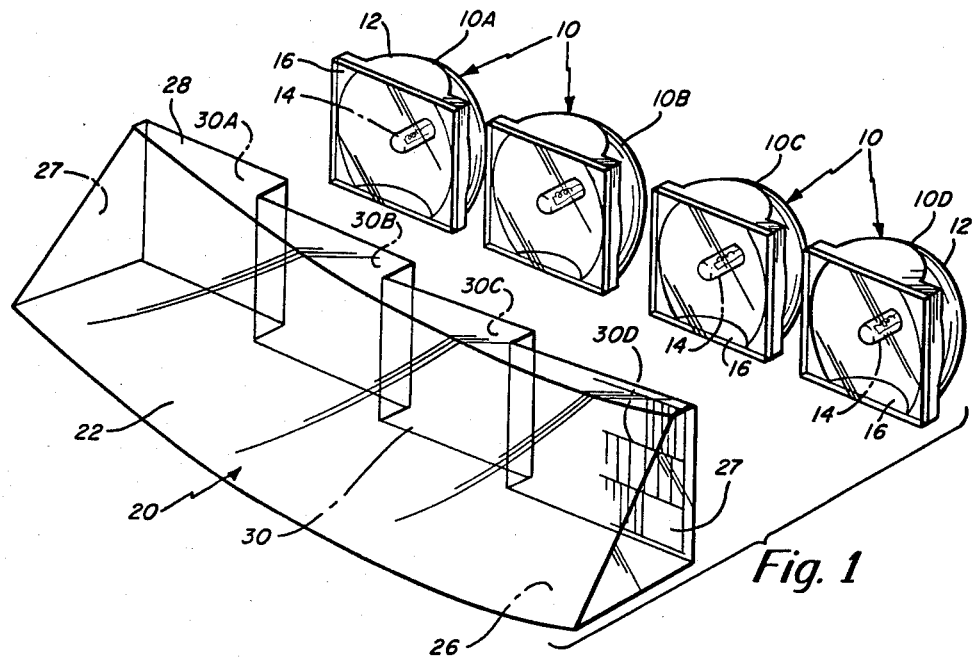
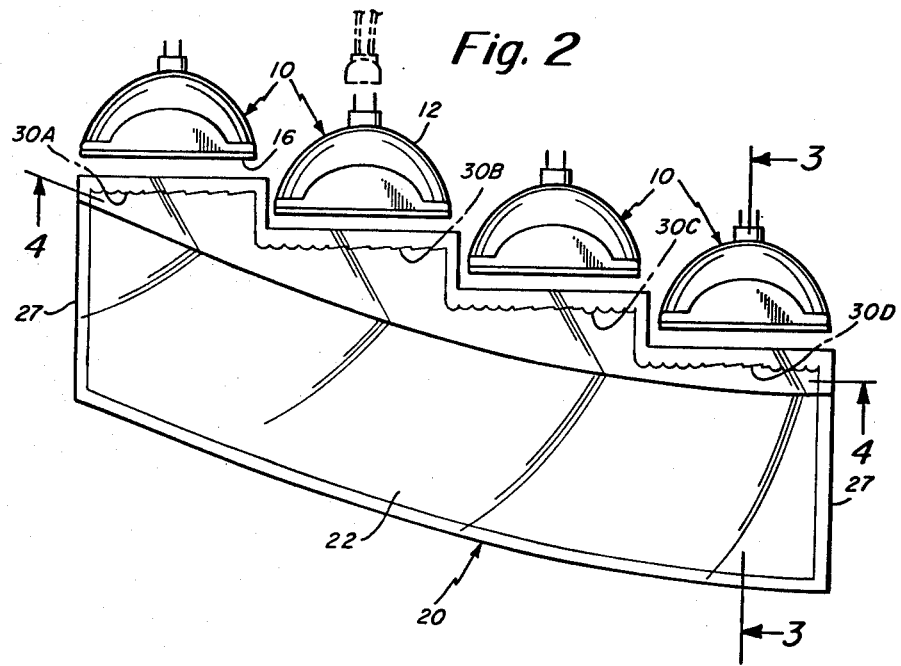

SEALED LENS MEMBER FOR USE IN A MOTOR VEHICLE LIGHTING SYSTEM

TECHNICAL FIELD

The present invention relates in general to a new and improved lighting system for motor vehicles and particularly a lighting system for providing forward illumination for an automobile. More particularly, the present invention relates to an improved lens member for use in such a lighting system. Even more particularly, the present invention is concerned with a motor vehicle lens member constructed so as to provide for improved aerodynamic performance of the motor vehicle. In this regard, it is a purpose of the invention to provide a lens member for use in a motor vehicle lighting system in which the front outer surface of the lens member is contoured to the automobile body shape, either curved or at a compound angle to the longitudinal automobile center line, while maintaining the optical control portion thereof in the optimal position (which is preferably normal, or nearly normal, to the automobile's center line).

BACKGROUND

Existing forward lighting systems used in motor vehicles, and in particular in automobiles, have generally not been designed with aerodynamic consideration in mind. As such, these systems have exhibited poor aerodynamic performance, which can be attributed to at least two factors. First, the vertical dimension (height) of the system's headlamp is relatively large (at least four inches, and in some versions, up to about seven inches). Second, the external surface of these headlamps have not been made in a cooperating shape with the frontal automobile surface. As is known, most headlamps occupy a position such that their lens member is vertical to the ground. With regard to the size (total frontal area, in square inches) of the lighting system, reference is made to copending applications Ser. No. 598,613 and Ser. No. 598,614, both filed Apr. 10, 1984, which applications are directed to improved motor vehicle lighting systems employing a plurality of capsule-reflector modules arranged in a substantially linear horizontal array and having a maximum vertical height of only about two inches and a length greater than the array height. In addition to a significant reduction in size, the lens member in accordance with the present invention is also capable of being positioned such that the front thereof approximately conforms to the contour of the motor vehicle, primarily for aerodynamic considerations. Furthermore, such a construction minimizes the collection of ice and snow during adverse weather conditions.

In order to contour a lighting system's headlamp to the frontal shape in many new automobile designs, it would be essential to orient the front portion of the headlamp at a relatively large angle (as much as sixty degrees) from vertical and/or at relatively large compound angles from a plane normal to the longitudinal center line of the vehicle. The front portion of existing headlamps is the portion wherein the principle lensing occurs so as to provide the specific light pattern required of the headlamp. Any tilting of this element from the vertical plane, however, would cause several problems, resulting in poor light distribution. That is, the ability to provide the desired light distribution degenerates and ultimately such a system would become unusable as the front surface of the lens departs from the standard position of approximately perpendicular to the center line of the vehicle.

In one type of headlamp arrangement found on some foreign automobiles, a conventional headlamp is mounted in a recess in the automobile's surface. A relatively thin, clear plastic member is then located in front of the headlamp and serves as a continuation of the automobile front surface. This member, however, provides no lensing functions (which are done instead by the headlamp's own lens in the known manner). In addition, such an arrangement has been known to permit dirt build-up in the cavity between headlamp and plastic member because such members are not hermetically sealed to the automobile. As such, these arrangements fail to satisfy motor vehicle safety regulations in this country and are thus prohibited.

DISCLOSURE OF THE INVENTION

A primary object of the present invention is to provide a lens member for a motor vehicle lighting system which is adapted in particular to improve the aerodynamic performance of the automobile.

Another object of the present invention is to provide such a lens member which is characterized by an improved construction that enables both contouring thereof for aerodynamic purposes as well as proper orientation of the lensing surface(s) to assure proper optical lensing operation.

A further object of the present invention is to provide a lens member in which the member is integrally constructed and includes a lensing surface and a front (forward), contoured surface.

Still another object of the present invention is to provide a lens assembly in which the lens is in the form of an integral member having a front, contoured surface and a rear, lensing surface, said member being hollow and integrally sealed so as to prevent any dirt build-up between the contoured surface and the lensing surface.

In accordance with a primary aspect of the instant invention, there is provided a lens member for use in a lighting system designed for providing forward illumination for a motor vehicle wherein said lighting system includes a plurality of individual light sources located adjacent each other, said lens member comprising a hollow, enclosed single piece element having a front, clear surface adapted for coinciding with the front, contoured surface of said motor vehicle, a rear lensing portion positioned at a predetermined angle relative to said individual light sources for having the light emitted by said sources pass therethrough, and a plurality of side walls for enclosing said element to provide a sealed, dirt-free member, said front clear surface and said side walls not including lensing elements thereon or as part thereof.

BRIEF DESCRIPTION OF THE DRAWINGS

FIG. 1 is a perspective view illustrating a motor vehicle lighting system employing the lens member of the present invention;

FIG. 2 is a plan view of the lighting system shown in FIG. 1, illustrating the placement of the lamp-reflector modules (light sources) thereof relative to the lens member of the instant invention;

BEST MODE FOR CARRYING OUT THE INVENTION

For a better understanding of the present invention, together with other and further objects, advantages and capabilities thereof, reference is made to the following disclosure and appended claims in connection with the above described drawings.

Figure 3:
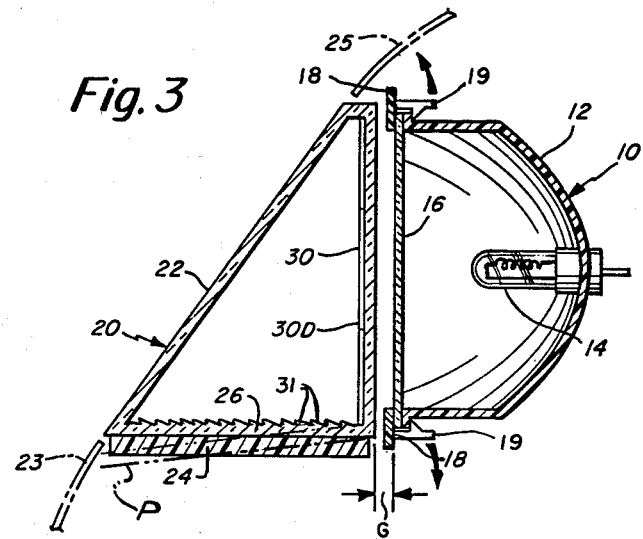
FIG. 3 is a cross-sectional view taken along line 3—3 of FIG. 2, illustrating one of the lamp-reflector modules of the system and the associated lens member of the invention as located adjacent thereto.

Referring now to the drawings, there is illustrated a lens member 20 in accordance with the principles of the present invention. The motor vehicle lighting system designed specifically to accommodate the invention, as explained below, is designed primarily for using a light and reflector combination in the form of an array of several (i.e., four) lamp-reflector modules 10. In FIG. 1, these modules are shown in an exploded perspective view with the modules thus being spaced slightly away from lens member 20. FIG. 2 also illustrates this array of lamp-reflector modules while FIG. 3 illustrates one of the modules in a cross-sectional view. Each of the modules 10 is hermetically sealed and comprises a parabolic reflector 12, a tungsten halogen, low wattage lamp capsule 14 mounted in the reflector, and a means for enclosing and sealing the front portion of the module, illustrated in FIG. 1 as an optically clear, planar cover 16. The cover 16 is preferably glass or plastic, while reflector 21 is plastic, and is sealed at its entire perimeter to the reflector. This sealing may be provided by means of an appropriate adhesive. It is also noted that each of the reflectors 12 has slightly truncated top and bottom sections. By low wattage is meant from between about ten and twenty-five watts. The filament in the lamp of each module is of tungsten and is axially oriented along the optical axis of the reflector. Preferably, the filament is a single coiled (C8) element. All modules 10 are identical to facilitate subsequent replacement. A preferred plastic for the reflector and cover members (if the covers are to be of plastic) is sold by the General Electric Company under the trademark Lexan, and is a polycarbonate.

With regard to FIG. 3, there is shown a means 18 (i.e., upper and lower brackets) for supporting the module 10. In this regard, the module 10 is preferably supported in an easily releasable mounting arrangement. That is, each bracket forms (or is attached to) part of the vehicle's structure. Both are spaced apart an established distance necessary to accommodate the module's front portion. To facilitate removal, a pair of clamps 19 are used which can be quickly opened (in the direction indicated) and the module removed. Alternatively, a singular bracket can be employed having an aperture (or apertures, if several modules are to be housed simultaneously) therein, the module being located within the aperture and retained (i.e., using suitable clamps as above) by the bracket. The module 10, for example, can be withdrawn simply by lifting the hood of the vehicle and removing the module from its supporting bracket(s), and then replacing the module with a substantially identical one. With regard to the support for the lens member of the instant invention, this is simply illustrated in FIG. 3 by means of a support base 24 which is used for retaining the lens member 20 in a proper position. The lens member can simply rest on support 24, which in turn may form part of (or be attached to) the vehicle and be retained (i.e., by suitable clamping members, not shown) in an appropriate fashion. It may even be possible to seal (i.e., using an adhesive) the lens member on the support if a more permanent arrangement is desired.

With regard to the reflector-lamp modules 10, the main lighting source, as stated, is a low wattage, tungsten-halogen capsule 14, which is integrally mounted in precisioned alignment with reflector 12. As noted in FIG. 3, the module 10 is disposed relative to the lens so that there is some gap (G) therebetween. It is of course understood that the several modules 10 and adjacent lens member 20 must be aligned together (e.g., mechanically) to assure optimum light emission through the lens. In addition, it is also considered important to provide some means of adjusting both lens and modules for proper alignment (e.g., in the event of vehicle tilting). Such a means could include a bubble level or the like as an integral part of lens member 20 to clearly indicate correct alignment (relative to vertical). Similar aligning means can be provided as an integral part of each capsule or as part of a common clamp-holder designed to accommodate all four modules in one assembly. Uniquely, alignment of all four can then be performed simultaneously, as can alignment of but a single lens member. Such a system should also include some means of indicating proper vehicle alignment to provide adequate comparison thereto prior to subsequent lens and-/or module alignment.

As to capsule 14, the halogen cycle is known in the lighting art and further explanation is thus not deemed necessary. One example of a tungsten-halogen lamp used in existing automobile headlights (i.e., sealed beam) is shown and described in U.S. Pat. No. 4,319,156 (Bienvenue et al.), the disclosure of which is thus incorporated herein by reference. It is of course understood that the capsule of the instant invention represents a substantially reduced (smaller) version of a lamp such as this, as well as being different in other ways. For example, the capsule's filament is preferably axially oriented along the reflector's optical axis to provide optimal output, as stated above. Such an axial arrangement is shown in FIG. 3. Further, the capsule of the instant invention includes only one filament and not two, as in U.S. Pat. No. 4,319,156, thus requiring only two lead-in wires and not four as shown in said patent.

In accordance with the invention, there is provided a lens member 20 which is comprised of a hollow, enclosed, single piece lens element having a clear front surface 22 positioned to coincide with the vehicle's front surface so as to enhance aerodynamic performance of the motor vehicle, as well as the system itself. In this regard, particularly note the front surface 22 in FIG. 3 and the manner in which it matches (conforms to) the contour of the adjacent automobile frontal surfaces 23 and 25. Additionally, the lens member 20 comprises a bottom wall 26, opposed side walls 27, top wall 28, and a rear lensing wall 30. It is preferred that substantially all of the lensing function occur at this rear wall 30, which, as shown in FIGS. 1 and 2, is actually separated into four individual lensing regions identified in FIG. 1 as walls 30A, 30B, 30C, and 30D. Each wall is planar (occupies a plane) and is oriented in an offsetting arrangement relative to the remaining walls, said planes being parallel as illustrated clearly in FIG. 2. In addition, these four walls respectively correspond to (align with) the individual lamp-reflector modules identified in FIG. 1 as modules 10A, 10B, 10C, and 10D, respectively. Specifically, each of the back walls 30 includes on the internal surface thereof selected lensing elements designed to direct (control) the forward light emitted by the respective module located adjacent thereto. Locating these elements internally in a closed member prevents the possible accumulation of dirt or other matter thereon which could adversely affect the lensing capability of member 20. The front contoured surface 22 is of clear plastic (the entire lens member is preferably also constructed of plastic, i.e., Lexan). The contoured front plastic cover is joined to the lensing walls and thus forms the described sealed member that prevents dirt and moisture from building up in the intervening space between the contoured front and rear portions thereof. Accordingly, the front surface does not provide a lensing function. Although front surface 22 is shown as being substantially flat, it is also possible to slightly curve this front portion of lens member 20 and not adversely affect successful operation thereof. And, although the rear wall 30 of lens member 20 is shown in the drawings as being parallel to the front, clear cover 16 of the adjacent module, it is possible to orient this wall at an angle of up to about thirty degrees from cover 16, the larger spacing of such an angle being at the lower portion of gap G. It is even further possible to orient the clear, non-lensing front wall (surface) 22 at an angle of from about thirty to about sixty degrees relative to the vertically positioned cover 16.

It is considered important in the instant invention to provide some means of preventing forward light from reflecting from the internal surface of bottom wall 26. This is achieved by providing a series of lateral grooves 31 (shown in FIG. 3) in this internal (upper) surface, said grooves preferably occupying the sawtooth pattern as depicted. Alternatively, an opaque coating (i.e., black paint) can be provided on this surface, or still further, the wall can be tilted (oriented) downwardly in a forward direction (i.e., to phantom line P) so as to slope away at an obtuse angle from the vertical cover 16.

Figure 4:
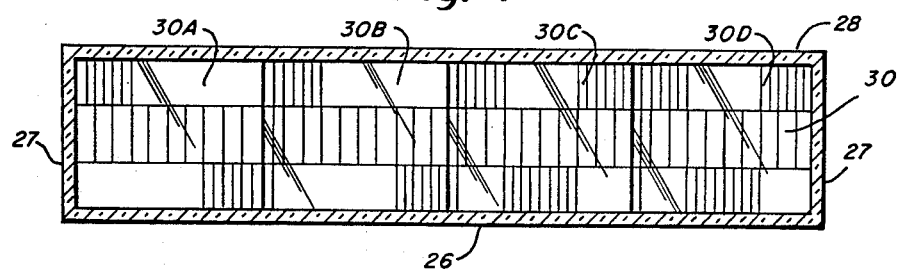
FIG. 4 is a front elevational view in section, as taken along line 4—4 of FIG. 2, illustrating the rear, inner lensing surface of the invention.

FIG. 4 is a cross-sectional view taken along line 4—4 of FIG. 2, showing the lensing walls which are identified in FIG. 1 as surfaces 30A, 30B, 30C, and 30D but not fully illustrated in FIG. 1 for clarification purposes. It is noted that the lensing side of the surface is directed inwardly, as stated, such that the lens, being a sealed unit, prevents dirt accumulation or the like on the lensing surface itself.

Although the disclosed lighting system incorporates at least one, and preferably several separate (e.g., four) modules 10 in combination with the lens member of the invention, in an alternate embodiment, a reflector member having a lamp capsule therein can be bonded directly to the flat rear surface of the lens. This can be used in an arrangement, for example, in which the light source or light capsule is replaceable through the rear of the reflector. In this instance, the individual lamp capsule would preferably include a suitable insulative base in which the capsule's lead-in wires are securedly positioned. The reflector's rear wall could include a suitable opening and corresponding internal grooving or the like designed to accommodate male pins or the like on the base being positioned (i.e., rotatively) therein.

One of the advantages of the construction of the present invention is that only one substantially universal lens wall need be designed, tooled and fabricated. For each different vehicle type having in turn a different frontal contour, a clear cover (surface wall 22) with the necessary enclosing side walls may be formed. This structure can then be bonded to such a universal lens wall to form a sealed module for the vehicle. In this way, a single, common lensing wall (identified in FIG. 1 as number 30) may be used with a number of differently shaped front sections depending upon the frontal contour of the vehicle in which it is to be used.

Reference has been made previously to the reflectors 12 of each module as including slightly truncated top and bottom segments. In an alternate arrangement, it is possible to use non-truncated reflectors. Also, the number of modules that are employed is dependent upon the vehicle's optical requirements. It is thus readily possible to increase the number of modules to include such auxiliary functions as turn signals, auxiliary driving lights, fog lamps, etc. In addition, it is clear from the foregoing that the preferred module-lens arrangement in the standard automobile can comprise a pair of lens members 20 spacedly positioned (e.g., within the fenders or grillwork) on the respective automobile, with a plurality (e.g., four) modules 10 for each lens. A total of at least eight modules will thus be employed per vehicle (four per side). Should auxiliary lights be also desired, these of course will add to this total (eight). It is also within the scope of this invention to provide but a singular lens member having all eight modules aligned therewith (thus incorporating a total of at least eight rear lens walls), but such an arrangement would require some form of central spacing of the two groups of modules to comply with existing motor vehicle regulations that mandate spaced-apart headlighting.

It is also understood that four modules per lens member provides sufficient illumination such that less than all (e.g., two) may be utilized to provide the necessary low beam requirements for one side of the vehicle while the activation of all four will serve to provide high beam illumination. The preferred low beam modules are those located nearest the outer side portion of the vehicle. In FIGS. 1 and 2, these are the two located to the left.

While there have been shown and described what are at present considered the preferred embodiments of the invention, it will be obvious to those skilled in the art that various changes and modifications may be made therein without departing from the scope of the invention as defined by the appended claims.

We claim:

1. A lens member for use in a lighting system designed for providing forward illumination for a motor vehicle wherein said lighting system includes a plurality of individual light sources located adjacent each other, said lens member comprising:

a hollow, enclosed single piece element having a front, clear surface adapted for coinciding with the front, contoured surface of said motor vehicle, a rear lensing portion positioned at a predetermined angle relative to said individual light sources for having the light emitted by said sources pass therethrough, and a plurality of side walls for enclosing said element to provide a sealed, dirt-free member, said front clear surface and said side walls not including lensing elements thereon or as part thereof.

2. The lens member according to claim 1 wherein said rear lensing portion includes a plurality of separate lens surfaces located internally of said single piece element and each adapted for aligning with a respective one of said light sources.

3. The lens member according to claim 2 wherein the number of said lens surfaces is four.

4. The lens member according to claim 2 wherein each of said lens surfaces occupies a plane, said planes being positioned in a substantially parallel and offsetting orientation.

5. The lens member according to claim 1 wherein said predetermined angle between said rear lensing portion and said individual light sources is within the range of from about zero degrees of about thirty degrees.

6. The lens member according to claim 1 wherein said lens member has a bottom wall also enclosing said member.

7. The lens member according to claim 6 wherein said bottom wall includes an internal surface having thereon means for preventing reflection of said light emitted by said light source.

8. The lens member according to claim 7 wherein said means for preventing reflection comprises a plurality of grooves formed within said surface.

9. The lens member according to claim 7 wherein said means for preventing reflection comprises an opaque coating on said internal surface.

* * * * *